Figure 1:
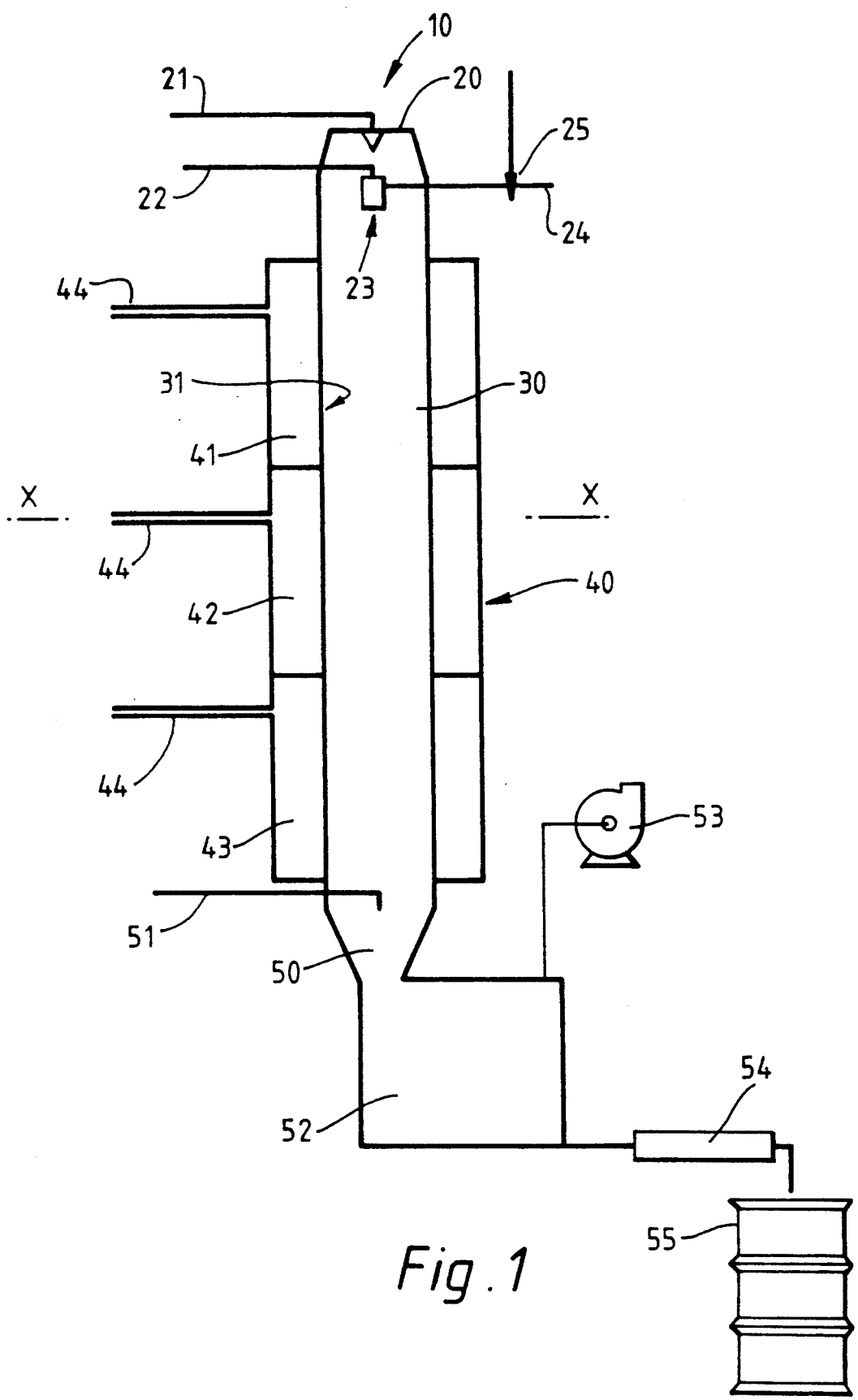

United States Patent [19]

Gilson et al.

[11] Patent Number: 5,319,120

[45] Date of Patent: Jun. 7, 1994

[54] POLYMERIZATION REACTOR AND POLYMERIZATION PROCESS

[75] Inventors: Jean-Marc Gilson, Sombreffe; Denis Sbardella, Halle, both of Belgium

[73] Assignee: Dow Corning S.A., Seneffe, Belgium

[21] Appl. No.: 909,859

[22] Filed: Jul. 7, 1992

[30] Foreign Application Priority Data

Jul. 12, 1991 [GB] United Kingdom ............... 9115170

[51] Int. Cl.$^5$ .......................... C07F 7/02; B01D 11/04
[52] U.S. Cl. .................................. 556/453; 556/463; 422/131; 422/239; 422/256
[58] Field of Search .............. 556/453, 463; 422/131, 422/239, 256

[56] References Cited

U.S. PATENT DOCUMENTS

| | | | |
|---|---|---|---|
| 3,094,497 | 6/1963 | Hyde | 260/18 |
| 3,160,601 | 12/1964 | Hyde | 260/46.5 |
| 3,434,805 | 3/1969 | Buchen | 23/285 |
| 3,595,896 | 7/1971 | Nitzsche et al. | 260/448.2 E |
| 3,816,493 | 6/1974 | Nitzsche | 260/448.2 E |
| 3,839,388 | 10/1974 | Nitzsche et al. | 260/448.2 |
| 3,853,934 | 12/1974 | Siciliano et al. | 260/448.2 E |
| 4,128,568 | 12/1978 | Büchner et al. | 260/448.2 E |
| 4,564,693 | 1/1986 | Riederer | 556/401 |
| 4,855,112 | 8/1989 | Adcock | 422/186.23 |

FOREIGN PATENT DOCUMENTS 215470 3/1987 European Pat. Off. .
382365 8/1990 European Pat. Off. .

OTHER PUBLICATIONS

European Search Report dated Oct. 20, 1992.

*Primary Examiner*—Paul J. Killos
*Assistant Examiner*—Porfirio Nazario
*Attorney, Agent, or Firm*—Roger H. Borrousch

[57] ABSTRACT

A continuous static polymerization reactor for the production of liquid polymers comprises an elongated hollow reaction chamber (30) which has a porous wall (31) and a jacket means (40) spaced around the reaction chamber (30), which is provided with means (44) for introducing a fluid through the porous wall (31). The reactor is particularly useful for a process for making liquid polymers by condensing monomers and/or oligomers. It comprising the use of a pressurized gas to cause the reaction mixture to reach a foam-like consistency. This is beneficial in the condensation polymerization. Feeding a fluid through the porous wall into the reaction chamber avoids build up of the polymer on the wall.

9 Claims, 3 Drawing Sheets

POLYMERIZATION REACTOR AND POLYMERIZATION PROCESS

This invention relates to a polymerisation reactor for making liquid polymers. It is particularly related to static reactors, more specifically those which are useful in the polymerisation of monomers or oligomers through condensation reactions. The invention also relates to a process of making liquid polymers.

Polymerisation reactors have been known for a long time and have been used for a variety of polymerisation processes. Reactors may be suitable for batch operation or continuous operation. The present invention is concerned with the latter type. Most of the current continuous polymerisation reactors are dynamic systems having some moving parts which effect mixing of the reagents and, where necessary the catalyst, and which force the reaction mixture through the reactor. Many continuous polymerisation units comprise tubular systems using appropriate mixing means. Dynamic reactors also require a fair amount of maintenance and are subject to potential breakdown of the mechanism. Static continuous reactors, where no moving parts are used to force the reaction mixture through the reactor, are also known. Adequate mixing in these reactors is mostly achieved through adapted internal geometry and/or the presence of internal parts, e.g. baffles, in the construction of the reactor.

In existing continuous reactors the residence time of the reagents may be quite extended, especially where efficient distribution of a catalyst and heat transfer are critical. In many systems there is also a danger that the polymer will build up on the walls of the reactor, thus reducing the efficiency of the unit and fouling the reactor. Build-up on the walls often requires shutting down of the polymerisation equipment and expensive labour in order to clean the build-up of polymers from the reactor walls. Numerous solutions have been suggested, but there is still a need to provide a polymerisation process which will allow the formation of polymers in an improved manner by using an efficient static reactor.

We have now found that it is possible to improve the polymerisation process and reduce the build-up of high viscosity liquid polymers on the walls of the reactor, by providing porous walls inside at least part of the reactor and backflushing, i.e. passing a fluid through said walls in the reactor.

The use of a porous wall in polymerisation reactors has been disclosed in Japanese Patent 60-47030. In said specification it is stated that as in condensation polymerisation, especially in the latter stages thereof, removal of the products of the condensation reaction is rate determining, the polymerisation rate is increased by carrying out the polymerisation in the form of a thin film. The specification addresses the problem of improving such thin film polymerisation. The proposed solution is the provision of a porous material body, through which an inactive gas can pass, inside a heated reaction vessel. The initial condensate is then passed in the form of a layer on the outer surface of the porous material body, and an inactive gas is passed through the porous material body and introduced into the layer of initial condensate to undergo condensation polymerisation. By using this method there is stated to be no need for any motive power to agitate a highly viscous material, or for maintaining a high vacuum system, and moreover, removal of the condensation product is facilitated by the introduction of the inactive gas into the initial condensate and foaming.

The Japanese application only relates to thin film polymerisation systems. Such systems require very large surface areas to achieve commercially acceptable output rates. There is no indication of any use for such system outside thin film polymerisation. Neither is there any indication how to solve the problem of build-up of high viscosity materials on the walls of a reactor. There remains a need to provide a static reactor which is able to give improved polymerisation, avoiding the build-up of polymers on the reactor walls and which is not restricted to the thin-film polymerisation systems.

According to the present invention there is provided a continuous static polymerisation reactor for the production of liquid polymers, which comprises an inlet means, an elongated hollow reaction chamber, having a porous wall, a jacket means spaced from and in surrounding relationship to said porous wall, means for introducing a fluid through the porous wall into the elongated hollow reaction chamber and an outlet means.

The inlet means of the polymerisation reactor may be any convenient means of introducing a reaction mixture into the reactor. Preferably, however, the inlet means is provided with a means of feeding the reagents under pressure. For example, the inlet means may be provided with a pumping system to feed the reaction mixture under pressure, e.g. from a container placed at some distance from the inlet means. Another method is the feeding under suction, e.g. via a pump or siphon system, or feeding under gravity. The feeding means may cause the reagents to pass through a heating mechanism which will allow the reagents to be brought to a higher temperature, e.g. the reaction temperature. Where a catalyst is required, the feeding means may also include a mixing device for mixing the reagents and the catalyst at the right proportions. As an alternative but less preferred method, the reaction mixture may be fed into the reaction chamber through the inlet means by being sucked through the reaction chamber, e.g. by applying reduced pressure on the outlet means.

In a preferred embodiment the reaction mixture is mixed with a pressurised gas at the inlet means, the gas being used to force the reaction mixture through the reaction chamber of the polymerisation reactor. This pressurised gas may be any inert gas, e.g. air or nitrogen. In this preferred embodiment the mixing in of the gas with the reaction mixture is effected in a way which will cause the reaction mixture to reach a foam-like consistency. In this way a large air liquid interface is created, making the system especially useful for polymerisation reactions which are of the condensation polymerisation type, i.e. where water or another simple material is formed as a by-product from the reaction of two monomers or oligomers.

Most preferably the inlet means is provided with an atomiser. Where pressurised gas is used some of the gas may be employed to aid the atomisation of the reaction mixture. Atomisers are well known in the art. The mixture may be atomised by conventional means. This includes the pressurising of the reaction mixture through an atomising device causing it to form a spray of small particles. An alternative, and more commonly used, method is the use of a pressurised gas, e.g. compressed air or nitrogen, to atomise the reaction mixture when it passes through the device. This is often referred to as the 2-fluid nozzle system. Also commonly used is the so-called rotary atomiser which causes the reaction mixture to form small droplets by feeding it onto a fast rotating plate. Where the reaction mixture is atomised, the additional use of pressurised gas and the narrowness of the reaction chamber into which the mixture is fed causes the composition to reach a foam-like consistency in which all ingredients are exceptionally well dispersion and mixed. Efficient mixing becomes very important where small amounts of catalyst are used in the polymerisation reaction. The reaction mixture may be brought to increased temperature by heating the mixture itself prior to the inlet means. Alternatively, or additionally, the mixture may be heated by using heated pressurised gas or by heating the reaction chamber into which the mixture is fed.

The reaction chamber is elongated and hollow to receive the reaction mixture. It is preferred that the reaction chamber is of cylindrical shape, although this is not necessary. Cylindrical chambers are easier to manufacture and have a geometry which is more favourable for good mixing, eliminating any possible dead space. With the expression elongate, is meant that the length of the chamber in the direction of flow of the reaction mixture is at least twice the diameter of the chamber at its widest point. Preferably the diameter of the reaction chamber is from 2 to 25 cm, more preferably from 5 to 10 cm. Larger diameters are also possible, but will only be efficient if sufficient reaction mixture is provided to cause sufficient flow in the reactor to ensure efficient mixing and heat transfer in the reaction mixture. Adequate rates for such diameters would be impracticable in most cases. The length of the reaction chamber will depend on the flow rate of the reaction mixture, the efficiency of the catalyst and other rate determining factors. A suitable length of reactor chamber would be from 25 cm to 20 meters, more preferably from 50 cm to 10 meters, most preferably 2 to 8 meters. It is preferred to have a reaction chamber of such dimensions that the reaction mixture will have a residence time in the reaction chamber of less than 5 minutes, preferably less than 2 minutes. A particularly useful reaction chamber, for example for the production of up to 200 kg of polymer per hour, would be about 4 meters in length with an internal diameter of about 5 cm. The chamber may be an elongate tube, which is substantially straight, or it may be coiled or in any other way shaped. A coiled reaction chamber has the advantage or reducing the required overall length or height of the reactor. The characterising feature of the reaction chamber is that it is equipped with a porous wall. In the most preferred embodiment the complete wall of the reaction chamber is porous, although it may be envisaged that certain portions thereof are not porous, e.g. parts which are used for fixing the reactor chamber in place or for attaching the jacket means. The porosity of the wall has to be sufficient to enable a fluid material to be fed though the wall into the reaction chamber. Where the fluid is a pressurised gas the requirement for porosity will be lower than where a liquid material is fed through. Preferably the porosity is sufficient to allow liquid material to pass through, e.g low or medium molecular weight oligomers or monomers, which may then take part in the polymerisation reaction. The porous wall in the reaction chamber may be made of any suitable material, which is itself inert to the polymerisation reaction. Suitable materials for making the porous wall include sintered porous plastic, e.g. polyethylene or polypropylene, sintered ceramic, sintered glass or microporous metal. Preferably the permeability of the porous wall is in the region of from 2 to 70 nanoperms, e.g. 20 nanoperms.

By virtue of the mixing system or atomising system which is used to feed the reaction mixture into the reaction chamber, and by the use of pressurised gas to force the mixture through the reactor, sufficient turbulence is created to ensure efficient polymerisation of the monomers and/or oligomers.

The porous wall of the reaction chamber is surrounded by a jacket means which is spaced from the porous wall so as to form a cavity around the porous wall. This jacket means may take the shape of the reaction chamber, and thus be elongate, preferably cylindrical in shape. Alternatively the jacket means may be a cuboid or short cylindrical shape inside which the reaction chamber is placed, e.g. where the latter is coiled, as referred to above. The jacket means may be made of any suitable material provided it is itself impermeable to the fluid which is used to be fed through the porous wall. Suitable materials include galvanised or stainless steel, glass, plastic or enamelled metal. The jacket means may be provided with a heating facility if desired.

The jacket means has connected to it a means for introducing a fluid through the porous wall. This may be in the form of a pump or other pressurising system, e.g. a source of compressed air. Where a reaction chamber of substantial length is used it may prove beneficial to have the jacket means split into several sections, each section providing the fluid at a different pressure, in order to adjust to the decreasing pressure which is present inside the reaction chamber when moving further from the inlet means. It is even possible to provide a plurality of jacket means, each adapted to introduce a different fluid into different parts of the reaction chamber if so desired. Only sufficient fluid needs to be introduced to avoid build-up of the polymer on the inside of the reactor wall. Where the fluid is a gas this may contribute to the formation of a foam-like consistency, increasing the surface area of the interface. Where the fluid is a liquid this liquid will be mixed into the reaction mixture. Depending on the nature of the liquid, it may co-react or it may be used as a diluent or solvent for the reaction mixture.

The polymerisation reactor also has an outlet means, most suitably the open end of the reaction chamber. There the polymerised liquid material may be collected immediately in a suitable receptacle, e.g. drum. It is possible to pass the polymer through a de-aeration system, especially in the preferred reactor where a mixture with foam-like consistency was formed to pass through the reaction chamber. Where there is a need to neutralise the catalyst, the collection point may be linked to a duct into which a neutralisation agent is added and mixed at the appropriate ratio. A cooling system may also be installed at or near the collection point, in order to bring the polymer to the desired temperature. A filtration system may be employed, e.g. to filter out any salts formed by neutralisation of the catalyst. Usually a filtration system will be installed before a cooling device as it is easier to filter a hot liquid which has a lower viscosity.

The reactor in which pressurised gas is used to reach a foam-like consistency is particularly useful for the manufacture of liquid polymers by condensation of oligomers and/or monomers.

According to another aspect of the invention there is provided a process for making liquid polymers by condensing monomers and/or oligomers in a polymerisation reactor, comprising the mixing of the monomers and/or oligomers with the appropriate amount of catalyst where required, the mixing of the resultant mixture with a pressurised gas to cause it to reach a foam-like consistency, feeding the foaming mixture through an inlet means into a reaction chamber having a porous wall, feeding a fluid through the porous wall into the reaction chamber in order to avoid build-up of the polymer on the wall of the reaction chamber, causing the monomers and/or oligomers to polymerise in the reaction chamber and collecting the polymers at the outlet means of the polymerisation reactor.

The term 'liquid', where herein used in relation to polymers, monomers or oligomers, denotes the type of materials which have a consistency which will allow them to flow at a temperature of 25° C. and adapt to the shape of the receptacle in which they are placed when submitted to a pressure, e.g. gravity. For the sake of clarity it is hereby stated that liquid materials excludes those materials which are clearly solid or clearly gaseous and those materials which are thermoplastic. For example, the term 'liquid polymers' includes apart from low viscosity polymers, e.g. those having a viscosity of 20 mm²/s, also those polymers which have a high viscosity, e.g. gum-like materials and some very loosely crosslinked materials, e.g. certain gels, which will flow under pressure.

The process is limited to those polymers which are made by the condensation reaction of monomers and/or oligomers. With condensation is meant the chemical reaction in which two or more molecules combine, with the separation of water or some other simple substance, as defined in ASTM D883-54T. The process of the invention is particularly useful for the condensation polymerisation because a large surface area is created at the gas liquid interface. This encourages the by-product of the condensation reaction, e.g. the water, to migrate into the gas phase, especially when the temperature in the reaction chamber is sufficiently high to volatilise the said byproduct. This will force the equilibrium of the reaction towards the condensation polymerisation, thus speeding up the polymerisation reaction. A typical example of a condensation reaction is an ester formation by reacting a carboxylic acid with an alcohol, or the formation of an ether by the reaction of two alcohols, both reactions liberating water. One particular condensation polymerisation reaction which is suitable for the process of the present invention is the formation of polysiloxane materials by condensation of organosilicon compounds having silanol groups.

The process of the invention is particularly preferred for the manufacture of organosiloxane materials by polymerisation of organosilicon compounds having silicon-bonded —OR radicals, in which R represents a hydrogen atom or a lower alkyl group having up to 6 carbon atoms provided at least some of the R groups are hydrogen atoms. It is most preferred that each R group represents a hydrogen atom.

Organosilicon compounds, forming the monomers or oligomers in the process of the invention, may be organosilanes, organosiloxanes, silcarbanes or mixtures of two or more of these. The silicon-bonded organic substituents in the organosilicon compound may be monovalent hydrocarbon groups having from 1 to 14 carbon atoms, for example alkyl, aryl, aralkyl, alkaryl or alkenyl groups or monovalent substituted hydrocarbon groups having from 1 to 10 carbon atoms, for example amino-substituted alkyl or aryl groups, mercaptoalkyl groups, haloalkyl groups, esterified carboxyalkyl groups, polyoxyalkylene groups and hydroxyalkyl groups. Specific examples of suitable organic substituents which may be present in the organosilicon compounds employed in the process of the invention are methyl, ethyl, propyl, hexyl, dodecyl, tetradecyl, phenyl, xylyl, tolyl, phenylethyl, vinyl, allyl, hexenyl, —R'NH₂, —R'NHCH₂CH₂NH₂, —R'SH, —R'Br, —R'Cl and R'OH, wherein R' represents a divalent organic group, preferably having less than 8 carbon atoms, for example —(CH₂)₃— or —CH₂CHCH₃CH₂—, arylene, e.g. —C₆H₄— or aralkylene, e.g. —(C₆H₃.CH₃)—. For the majority of commercial applications at least 50% of the organic substituents will be methyl groups, any remaining groups being selected from vinyl and phenyl groups. More preferably at least 80% of all organic substituents are methyl groups, most preferably, substantially all organic substituents.

Although organosilicon compounds for use in the process of the invention may have a number of silicon-bonded groups —OR per molecule, it is preferred that no more than two —OR groups are present on each molecule. This will encourage the formation of substantially linear polysiloxane materials. The preferred organosilicon compounds are short chain linear polydiorganosiloxane materials having silanol end-groups. These materials have the average general formula

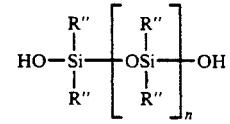

wherein each R" denotes an organic group as hereinabove described and n is an integer, preferably having a value of no more than 100. As a general principle, however, an organosilicon compound which is a siloxane polymer, is to be regarded as an oligomer for the purpose of this invention as long as it has a shorter siloxane chain length than the final product obtained by the process of the invention. In the preferred polydiorganosiloxanes, each R" denotes a methyl group and n has a value of from 10 to 300, more preferably 50 to 150, most preferably from 75 to 100. These polydiorganosiloxanes are produced by hydrolysis and condensation of dihalodiorganosilanes and are commercially available materials.

In the process of the invention silanol end-blocked polydiorganosiloxanes of high viscosity may be produced. If desired, however, condensation products may be end-blocked with triorganosiloxy units. One method of effecting such end-blocking comprises incorporating a triorganoalkoxy silane or a triorganosilanol in the reaction mixture. A more preferred method of producing triorganosiloxy end-blocked reaction polydiorganosiloxanes comprises the incorporation of polydiorganosiloxane materials, which are end-blocked with a triorganosiloxane group at one end and a hydroxyldiorganosiloxane group at the other end. An alternative way is the use of lower molecular weight polydiorganosiloxanes having triorganosiloxane end-groups. This requires usually the use of a catalyst which has some activity in the breaking of the siloxane Si—O—Si bond. Yet another alternative is the use of a silazane, e.g. hexamethyldisilazane. Suitable triorganosiloxane end-blocking units include a wide variety of materials, e.g. trimethylsiloxane, triethylsiloxane, dimethylvinylsiloxane and dimethylphenylsiloxane.

The preferred process of the invention is suitable for use in the preparation of a variety of organosilicon products by a condensation reaction. If desired there may be included with the organosilicon compound other organo-silicon compounds for example alkoxysilanes which are reactive with the silanol-containing reagent or condensation products to provide organofunctional or chain terminating groups. Examples of such silanes are trimethyl methoxy silane, methyl phenyl dimethoxy silane, methyl phenyl vinyl ethoxysilane and aminopropyl trimethoxy silane. Instead of incorporating end-blocking reagents in the reaction mixture at the inlet means of the reaction chamber, as described above, it is possible to incorporate these reagents by using them as the fluid which is introduced through the porous wall of the reaction chamber.

The preferred process of the invention involves contacting the organosilicon compounds, which are monomers or oligomers, with a catalyst at a temperature at which the desired rate of polymerisation occurs. It is preferred for the production of polysiloxane materials that the temperature employed is in the range of from about 30° C. to about 300° C. Reactions at lower temperatures are normally too slow to be of commercial interest. More preferably the polymerisation reaction is carried out at a temperature of from 50° to 200° C., most preferably 70° to 180° C. It is also preferred that the by-product formed during the condensation reaction is removed. This will cause the acceleration of the reaction and is suitably achieved by the use of an extraction system.

Sufficient catalyst is employed to achieve the desired rate of condensation, having regard to the nature and geometry of the processing equipment, the temperature of the process and other factors, e.g. the residence time of the reaction mixture in the reaction chamber. In most cases it is preferred to employ from 0.001 to 5% by weight of the catalyst based on the weight of the organosilicon compounds in the reaction mixture.

Preferred catalysts are well known condensation catalysts which have been described in a number of publications. Some catalysts will promote condensation reactions, but also act as equilibration catalysts. These are exemplified by sulphuric acid, hydrochloric acid, Lewis acids, sodium hydroxide, tetramethylammonium hydroxide, tetrabutyl phosphonium silanolate and amines. Such catalysts, though not preferred, are useful provided the presence of low molecular weight species in the final product is not to be avoided, or provided the catalyst is inactivated prior to the rearrangement of polymers. More preferred are condensation specific catalysts. These include dodecylbenzene sulphonic acid, n-hexylamine, tetramethylguanidine, carboxylates of rubidium or cesium, hydroxides of magnesium, calcium or strontium and other catalysts as are mentioned in the art, e.g. in G.B. patent specifications 895 091, 918 823 and E.P. specification 382 365. Also preferred are catalysts based on phosphonitrile chloride, for example those prepared according to U.S. Pat. Nos. 3,839,388 and 4,564,693 or E.P. application 215 470 and phosphonitrile halide catalysts having the general formula $[X(PX_2=N)PX_3]^+[MX_{(v-t+1)}R'_t]^-$, wherein X denotes a halogen atom, M is an element having an electronegativity of from 1.0 to 2.0 according to Pauling's scale, R' is an alkyl group having up to 12 carbon atoms, n has a value of from 1 to 6, v is the valence or oxidation state of M and t has a value of from 0 to $v-1$.

Termination of the polymerisation reaction, if desired, may be achieved by conventional and well known methods. For example, the temperature of the reaction mixture may be lowered beyond the point where the catalyst is active. Alternatively, the reaction mixture may be heated to a point where the catalyst is inactivated, e.g. by decomposition, provided the polymer is not affected by such action. Yet another alternative termination procedure is the introduction of an inactivation agent when the polymer has reached its desired degree of polymerisation. This will depend on the type of catalyst used, and may be a neutralisation agent where the catalyst is acidic or alkaline. Suitable neutralisation agents include amines, epoxy compounds and mild acid materials. Where the catalyst is a solid material, or is supported on a solid structure, removal of the catalyst, e.g. by filtration may be used to terminate the reaction.

The condensation products of the process of the invention may vary in viscosity depending on the polymerisation circumstances. The process according to the invention is capable of producing very high viscosity polymers, e.g. of 1,000,000 mm²/s or more, preferably up to about 500,000 mm²/s. Resulting polymers are useful in a number of applications as is well known in the art of organosilicon compounds. Examples of suitable applications include treatment of textile to render them water repellant, paper coating to impart high release surfaces, manufacture of sealant and adhesive products and production of elastomer-forming compositions.

There now follows the description of a specific embodiment of the reactor, which is to be read in conjunction with the drawings. Also given are examples of the process in which all parts and percentages are expressed by weight, unless otherwise indicated.

FIG. 1 gives a schematic view of a reactor according to the invention.

Figure 2:
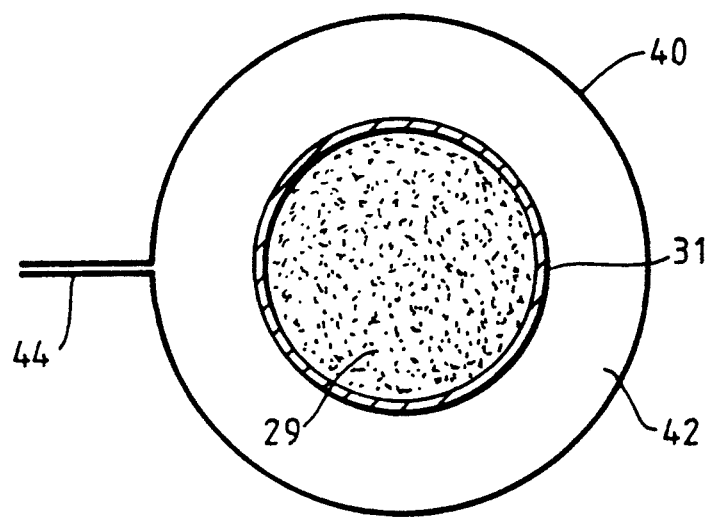

FIG. 2 gives a cross-sectional view at X__X through the reaction chamber.

Figure 3:
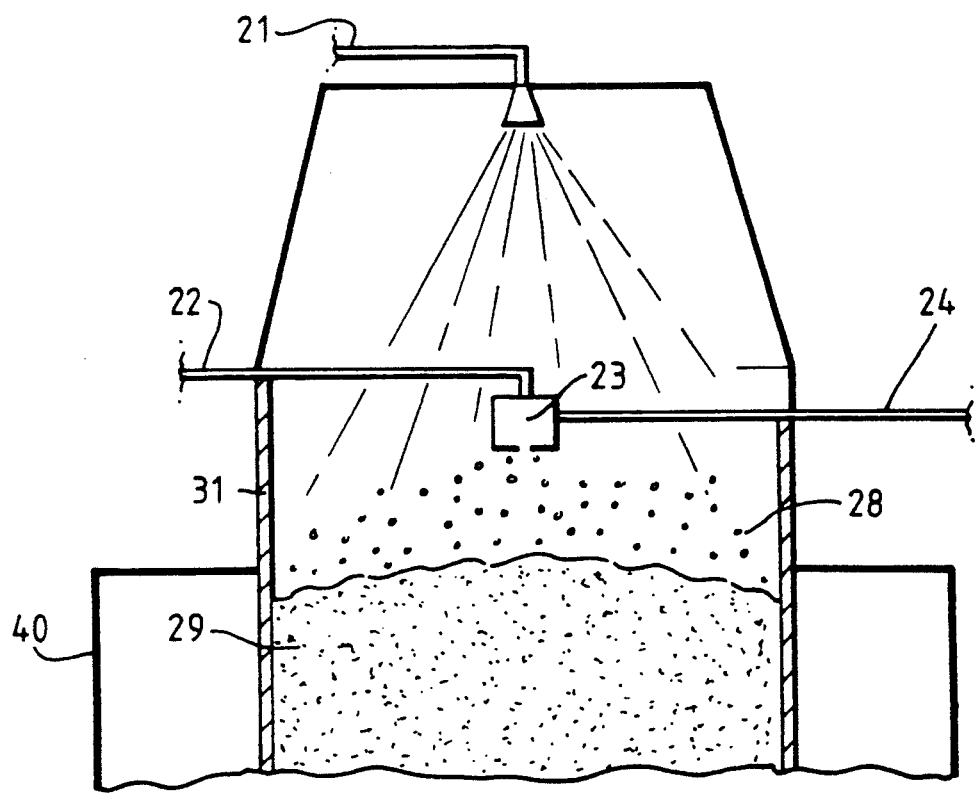

FIG. 3 gives a detailed schematic view of the inlet means and atomising head.

Figure 4:
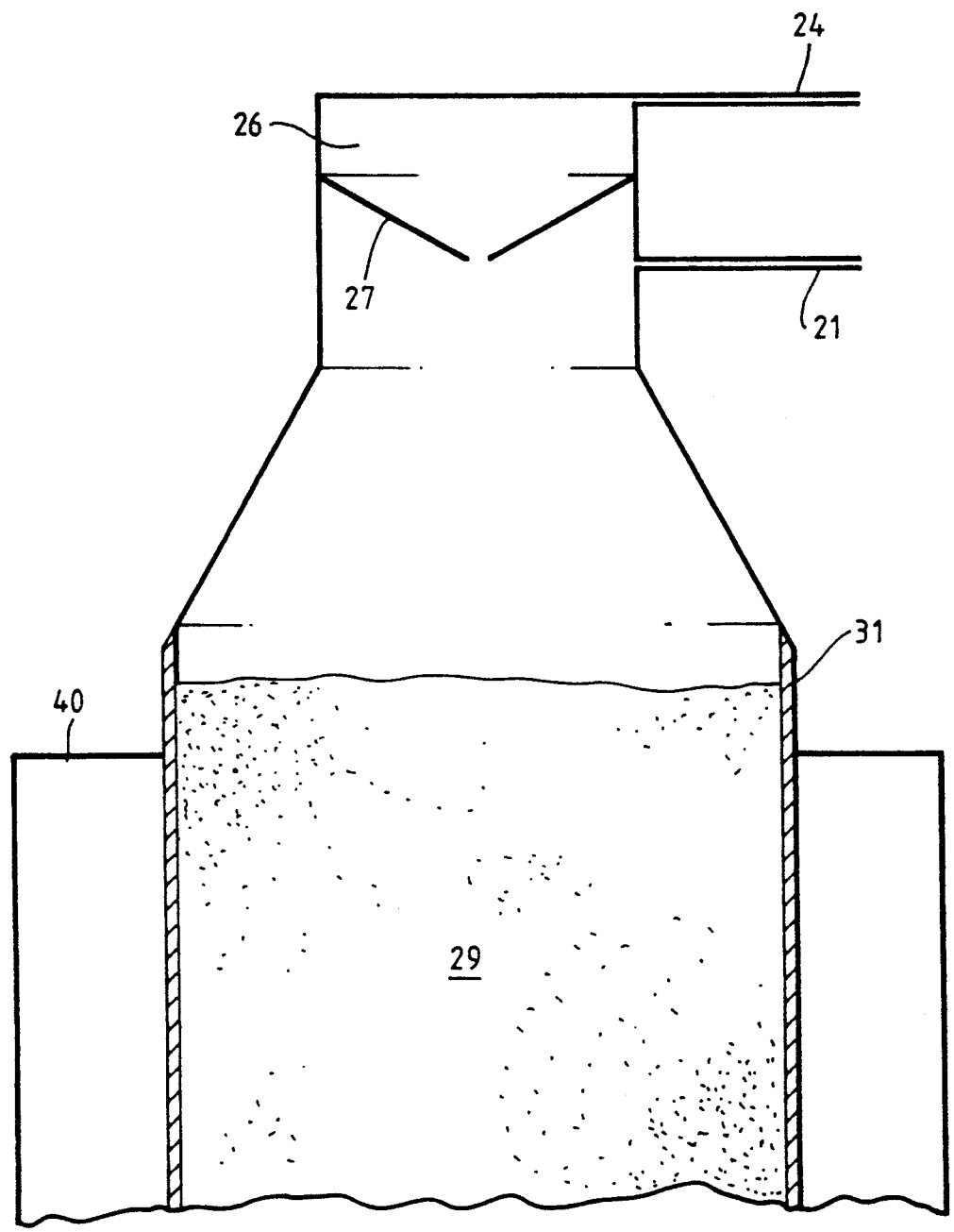

FIG. 4 shows a detailed schematic view of an alternative inlet means, having a conically shaped baffle.

The exemplified reactor (10) consists of an inlet means (20), a reactor chamber (30), having a porous wall (31), a jacket means (40) and an outlet means (50). The inlet means (20) comprises a compressed air supply (21) which passes compressed air from a compressor (not shown) through a heat exchanger (also not shown). A second compressed air supply (22) is linked to an atomising device (23) which in this case is a two-fluid nozzle. Also linked to the atomising device (23) is a supply line for the reaction mixture (24) which has a mixing device (25) installed along the line for mixing in a catalyst at the required proportions. In an alternative arrangement (FIG. 4) the inlet means has a mixing device (25) for introducing a catalyst to the oligomers/monomers which are fed via a supply line (24) to a small chamber (26) provided with an open truncated conically shaped baffle (27), which causes the reaction mixture to be thoroughly mixed. A compressed air line (21) is feeding into the small chamber (26). A reaction chamber (30) has an internal diameter of 40 mm, and a total length of 4000 mm. It comprises a porous cylindrical wall (31), which is substantially straight and is positioned vertically with the inlet at the upper end. The porous wall is made from sintered polypropylene and has a permeability of 20 nPm (FIG. 4) or from ceramic with a permeability of 3 nPm (FIGS. 1-3). Surrounding the porous wall (31) is a jacket means (40) which is divided in three portions (41, 42, 43) each of which surrounds roughly one third of the porous wall. Each of the portions of the jacket means are linked to a fluid supply (44) which may be set at different pressure for each of the portions. The fluid supply is linked via a pump to a container for a liquid (not shown). The outlet means (50) comprises an inlet for a neutralisation agent (51) a de-aeration tank (52), to which is linked an extraction system (53), a filtration system (54) and a drum-off point (55).

In use the catalyst and monomers/oligomers are mixed and fed into the atomiser, together with some compressed air, or fed into the mixing chamber with the conically shaped baffle. A separate supply of heated compressed air forces the atomised or mixed mixture (28) to foam (29) and be pushed down the reaction chamber, while a supply of oligomers are fed separately from the jacket means through the porous wall into the reaction chamber. At the outlet means of the reactor, a mixture in foam-like consistency of the reaction product and compressed air is mixed with a neutralisation agent. The mixture is then filtered and de-aired, and collected in drums.

EXAMPLE 1

A production run of polydimethylsiloxane was made using the reactor with the mixing means as exemplified in FIG. 4. The process being a continuous polymerisation parameters were varied during a six hour run, as indicated in Table I. As oligomer, fed through line (24) (Oligomer A) was used three α,w-hydroxyl end-blocked polydimethylsiloxane polymer, having a viscosity of 90, 120 or 240 mm²/s respectively, as indicated in the Table. The flow rate is given as Flow in kg of oligomer per hour. Compressed air was fed through line (21) and is given as Air Flow in normal cubic meters per hour at 1 bar and 25° C. (Nm³/h). The catalyst employed was dodecylbenzene sulphonic acid (DBSA), given in % by weight based on the amount of Oligomer A in the Table. 9 samples were taken at different times throughout the run (indicated as Time in minutes in the Table) and the corresponding parameters are given in the Table. As oligomer fed through the porous wall, via line (44), was used a α,w-hydroxyl end-blocked polydimethylsiloxane polymer having a viscosity of about 10,000 mm²/s, at a rate of 5 kg per hour over the total surface of the reactor chamber. The viscosity of the final polymer (Product) was measured, given in 1000×mm²/s in the Table. A gas permeation chromotographic (GPC) analysis indicated that the Product was homogeneous. The catalyst was neutralised with ethylene diamine.

TABLE I

| Sample | 1 | 2 | 3 | 4 | 5 | 6 | 7 | 8 | 9 |
|---|---|---|---|---|---|---|---|---|---|
| Time | 60 | 105 | 150 | 195 | 240 | 285 | 300 | 310 | 315 |
| Oligomer A | | | | | | | | | |
| Flow | 59 | 59 | 59 | 59 | 59 | 59 | 71 | 70 | 70 |
| Viscosity | 240 | 240 | 120 | 120 | 90 | 90 | 90 | 90 | 90 |
| Air Flow | 112 | 112 | 112 | 122 | 119 | 126 | 133 | 225 | 40 |
| DBSA % | 4 | 4 | 4 | 4 | 4 | 4 | 4.8 | 4.8 | 4.8 |
| Product Viscosity | 44 | 46 | 43 | 42 | 37 | 38 | 21 | 19 | 15 |

It is clear from Table I that an increase in the initial viscosity of the linear low molecular weight oligomer feed through line (24) (FIG. 4) from 90 to 240 mm²/s provided a product variation in viscosity from 37,000 to 46,000 mm²/s. From the GPC analysis it was clear that only small differences in the polymers occurred. This indicates that the residence time in the reactor was constant for long periods of time and implies that a constant flow was produced in the reactor as a result of the constant quality of porous wall surface (31), produced by backflushing the surface with medium viscosity siloxane oligomers. Inspection of the apparatus after the run revealed that the reactor surfaces were clean and no build up of high viscosity polymer had occurred.

EXAMPLE 2

A polymerisation run of siloxane materials was carried out on the reactor as described in FIGS. 1 to 3. The length of the reactor (30), from the point where the reagents were injected to the outlet means (50) was about 4 meters. The process is a continuous polymerisation and reaction conditions were allowed to settle before results were measured. Airflow through line (21) was 160 Nm³/hour, this air was heated to a temperature of about 170° C. Airflow through line (22) was 17 Nm³/hour of cold air used to atomise the oligomer, fed through line (24). This oligomer was a α,w-hydroxyl end-blocked polydimethylsiloxane polymer, having a viscosity of 100 mm²/s, which was fed at a rate of 140 kg/hour. The catalyst employed was an antimony derivative of a phosphonitrile chloride, used in amounts as indicated in Table II in parts by weight per million parts of the oligomer (ppm). The catalyst was supplied as a solution in CH₂Cl₂. The temperature of the incoming oligomer ($T_{in}$) was varied and this, as well as the outgoing temperature ($T_{out}$), is recorded in Table II. The resulting rate of polymerised material produced was about 0.145 Nm³/hour. As oligomer fed through the porous wall, via line (44), was used a α,w-hydroxyl end-blocked polydimethylsiloxane polymer having a viscosity of about 10,000 mm²/s, at a rate of 5 kg per hour over the total surface of the reactor chamber. The viscosity of the final polymer (Product) was measured, given in 1000×mm²/s in Table II. A gas permeation chromotographic (GPC) analysis indicated that the Product was homogeneous having a polydispersity of no more than 2. The catalyst was neutralised with trihexylamine.

TABLE II

| Sample | Catalyst (ppm) | $T_{in}$ (°C.) | $T_{out}$ (°C.) | Viscosity (mm²/s × 1000) |
|---|---|---|---|---|
| 1 | 22.50 | 109 | 102.6 | 4.3 |
| 2 | 44.16 | 150 | 124.6 | 306.0 |
| 3 | 22.50 | 119 | 105.8 | 8.1 |
| 4 | 22.50 | 129 | 109.2 | 13.4 |

TABLE II-continued

| Sample | Catalyst (ppm) | $T_{in}$ (°C.) | $T_{out}$ (°C.) | Viscosity ($mm^2/s \times 1000$) |
|---|---|---|---|---|
| 5 | 22.50 | 139 | 113.6 | 21.8 |
| 6 | 22.50 | 150 | 117.8 | 34.0 |
| 7 | 22.50 | 147 | 122.9 | 85.5 |
| 8 | 10.50 | 148 | 124.6 | 3.1 |
| 9 | 13.50 | 148 | 125.6 | 19.3 |
| 10 | 17.25 | 148 | 125.9 | 42.0 |
| 11 | 21.00 | 148 | 125.3 | 75.0 |
| 12 | 24.00 | 148 | 125.1 | 116.0 |
| 13 | 27.75 | 149 | 124.8 | 160.0 |
| 14 | 29.95 | 149 | 124.9 | 204.0 |
| 15 | 32.86 | 149 | 124.9 | 230.0 |
| 16 | 36.51 | 149 | 124.9 | 279.0 |
| 17 | 40.16 | 150 | 124.6 | 306.0 |
| 18 | 43.50 | 160 | 130.0 | 404.0 |
| 19 | 47.00 | 150 | 124.0 | 332.0 |

It is clear from Table II that an increase in the amount of catalyst used provided a product variation in viscosity from 3,100 to 404,000 $mm^2/s$. From the GPC analysis it is clear that the product had a good degree of monodispersity. Inspection of the apparatus after the run revealed that the reactor surfaces were clean and no build up of high viscosity polymer had occurred.

That which is claimed is:

1. A process for making liquid polymers by condensing organosilicon compound monomers and/or oligomers in a polymerisation reactor having an inlet means, a reaction chamber with a porous wall and an outlet means, comprising the mixing of the monomers and/or oligomers with a condensation catalyst in an amount of 0.001 to 5% by weight based on the weight of the organosilicon compound monomers and/or oligomers in the resulting mixture, the mixing of the resultant mixture with a pressurised gas to cause it to reach a foam-like consistency, feeding the foaming mixture through an inlet means into the reaction chamber having a porous wall, feeding a fluid through the porous wall into the reaction chamber in order to avoid build up of the polymer on the wall of the reaction chamber, causing the monomers and/or oligomers to polymerise in the reaction chamber and collecting the polymers at the outlet means of the polymerisation reactor.

2. A process according to claim 1 wherein the monomers and oligomers are organosilicon compounds having silicon-bonded —OR groups, in which R is selected from the group comprising hydrogen and lower alkyl groups having up to 6 carbon atoms, provided at least some R groups are hydrogen, and in that the liquid polymers are polydiorganosiloxane materials.

3. A process according to claim 2 wherein the organosilicon compounds are α,w-hydroxyl end-blocked polydimethylsiloxanes.

4. A process according to claim 2 wherein the polymers are polydimethylsiloxane materials, which are end-blocked with groups selected from diorganosiloxanol and triorganosiloxane groups.

5. A process according to claim 4 wherein the triorganosiloxane groups are selected from trimethyl siloxane, vinyldimethyl siloxane and dimethyl phenyl siloxane groups.

6. A process according to claim 1 wherein the polymerisation reaction is carried out at a temperature of from 30° to 300° C.

7. A process according to claim 1 which is carried out in the presence of a condensation specific catalyst.

8. A process according to claim 7 wherein the catalyst is selected from dodecylbenzene sulphonate, n-hexylamine, tetramethylguanidine, carboxylates of rubidium, carboxylates of cesium, hydroxides of magnesium, hydroxides of calcium, hydroxides of strontium, catalysts based on phosphonitrile chloride and phosphonitrile halide catalysts having the general formula $[X(PX_2=N)PX_3]^+[MX_{(v-t+1)}R'_t]^-$, wherein X denotes a halogen atom, M is an element having an electronegativity of from 1.0 to 2.0 according to Pauling's scale, R' is an alkyl group having up to 12 carbon atoms, n has a value of from 1 to 6, v is the valence or oxidation state of M and t has a value of from 0 to $v-1$.

9. A process according to claim 1 wherein the catalyst is neutralised when the polymer has reached its desired degree of polymerisation.

* * * * *